(12) United States Patent
Ogasawara

(10) Patent No.: US 6,760,652 B2
(45) Date of Patent: Jul. 6, 2004

(54) IN-VEHICLE ACCESSORY SYSTEM UTILIZING REGION-BASED AUTOMATIC FUNCTION SETTING METHOD

(75) Inventor: Akihiro Ogasawara, Toyokawa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/201,193

(22) Filed: Jul. 24, 2002

(65) Prior Publication Data

US 2003/0045979 A1 Mar. 6, 2003

(30) Foreign Application Priority Data

Aug. 30, 2001 (JP) ........................................ 2001-261425

(51) Int. Cl.[7] .................................................. G06F 7/00
(52) U.S. Cl. .................................................. 701/36
(58) Field of Search ........................... 701/36, 23–26, 701/28, 117–119, 200–202, 207–209, 211, 213–214, 300; 703/23–24, 27; 348/148–149, 154–158, 441, 443, 449, 453–454, 476–480

(56) References Cited

U.S. PATENT DOCUMENTS 5,911,774 A    6/1999    Itoh 6,035,400 A   *   3/2000    Yasuoka ...................... 713/200

FOREIGN PATENT DOCUMENTS

| JP | B2-6-32155 | 4/1994 | | |
|---|---|---|---|---|
| JP | A-6-104786 | 4/1994 | | |
| JP | 7-105490 | * | 4/1995 | ......... B08G/1/0969 |
| JP | B2-7-46767 | 5/1995 | | |
| JP | A-10-208194 | 8/1998 | | |
| JP | A-10-232137 | 9/1998 | | |
| JP | A-11-98566 | 4/1999 | | |
| JP | A-2000-266557 | 9/2000 | | |
| JP | A-2001-67793 | 3/2001 | | |

* cited by examiner

Primary Examiner—Thu V. Nguyen
(74) Attorney, Agent, or Firm—Posz & Bethards, PLC

(57) ABSTRACT

An in-vehicle accessory system for an audio and navigation system includes a control device, a display, a TV tuner, a DVD player, a VCR, a GPS receiver and a switching circuit. The control device includes a ROM. The control device determines a region in which a vehicle is located based on a signal from the GPS receiver. Then, the control device determines whether outputting video signals to the display is permitted in the region based on information stored in the ROM. If the video display is prohibited in the region, the control device turns off the switching circuit to disable the video signal output from the TV tuner, DVD player or VCR.

12 Claims, 3 Drawing Sheets

| COUNTRY/STATE | VIDEO DISPLAY | DVD REGION CODE | VIDEO STANDARD |
|---|---|---|---|
| IOWA | ○ | 1 | NTSC |
| IDAHO | × | 1 | NTSC |
| ⋮ | ⋮ | ⋮ | ⋮ |
| GERMANY | ○ | 2 | PAL |
| FRANCE | × | 2 | SECAM |
| ⋮ | ⋮ | ⋮ | ⋮ |
| JAPAN | × | 2 | NTSC |
| ⋮ | ⋮ | ⋮ | ⋮ | ize
IN-VEHICLE ACCESSORY SYSTEM UTILIZING REGION-BASED AUTOMATIC FUNCTION SETTING METHOD

CROSS REFERENCE TO RELATED APPLICATION

This application is based on and incorporates herein by reference Japanese Patent Application No. 2001-261425 filed on Aug. 30, 2001.

FIELD OF THE INVENTION

The present invention relates to an in-vehicle accessory system utilizing a region-based automatic operation switching method.

BACKGROUND OF THE INVENTION

In an in-vehicle audio and navigation system, video from a TV tuner, a VCR and a DVD player are displayed on a display. Because the video displayed on the display while a vehicle is in operation may disturb a driver, some countries have regulations on displaying video.

In the United States, each State has different regulations. The in-vehicle audio and navigation system needs to be configured differently for each State so that it complies with the regulations. This makes it difficult to reduce the cost of the system. Moreover, if a vehicle is purchased in a State where the regulations are not instituted and driven in a State where regulations are instituted, the driver may violate the regulations. The same situation may occur in Europe when driving into another country.

In DVD systems, DVD players contain region codes. Individual DVDs also contain region codes. The DVD player region code must match the DVD region code in order for the DVD system to function properly. Within a DVD player, the region code is preset by an external device according to a particular region in which a vehicle will be used. This makes it difficult to reduce the cost of the system.

Moreover, different television systems are used in European countries. For each country, setting a video standard corresponding to its television system and channel frequencies in TV tuners is required. The user of the system may not be able to watch TV without resetting the video standard and channel frequencies after crossing a border.

SUMMARY OF THE INVENTION

The present invention therefore has an objective to provide an in-vehicle accessory system that automatically sets its functions based on a region in which the vehicle is located.

The present invention has another objective to provide a method for automatically setting the functions of the in-vehicle accessory system based on the region.

The in-vehicle accessory system of the present invention includes a current position search device, a region determination device, a setting information retrieval device and a function setting device. The current position search device searches a current position of a vehicle and the region determination device determines a region in which the searched position is located. The setting information retrieval device retrieves setting information corresponding to the determined region. The function setting device sets functions of the system based on the retrieved information. With this configuration, the system automatically resets its functions when the vehicle enters into a different region in which different function setting is required.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1:
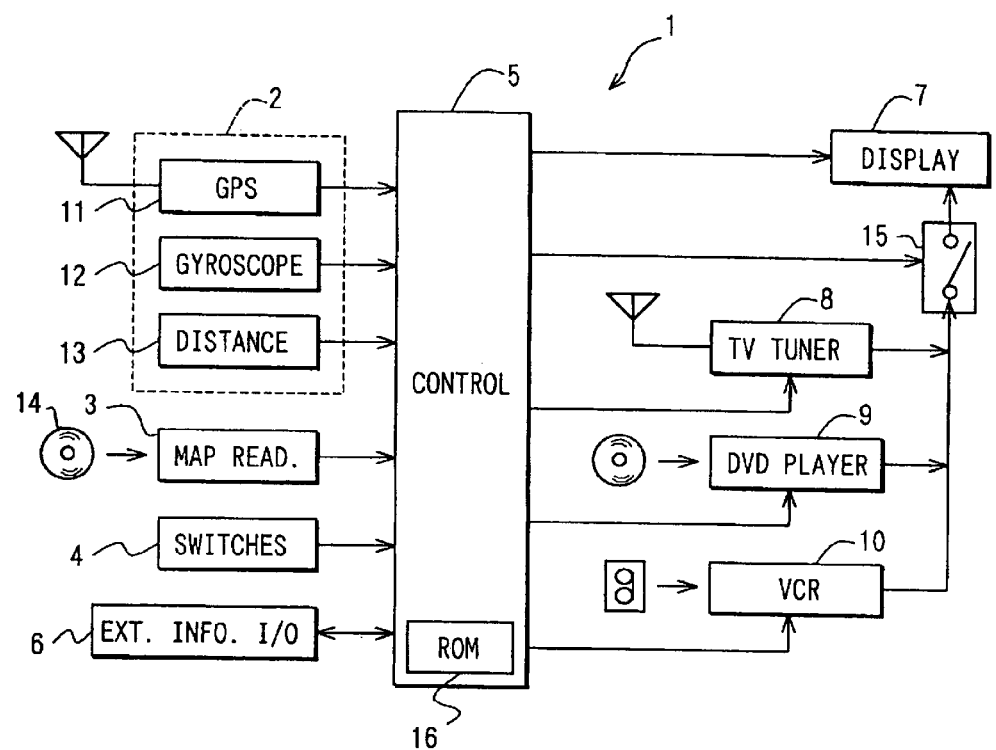
FIG. 1 is a block diagram showing an in-vehicle accessory system according to an embodiment of the present invention.

Referring to FIG. 1, an accessory system 1 for an in-vehicle audio and navigation system includes a position search device 2, a map data reading device 3, a group of operation switches 4, a control device 5, an external information input and output (I/O) device 6, a display 7, a TV tuner 8, a DVD player 9 and a VCR 10.

The control device 5 is connected to the position search device 2, map data reading device 3 and switches 4. The external information I/O device 6 exchanges data with an infrastructure such as a VICS system. The display 7 is an in-vehicle display device such as a full color LCD display. The TV tuner 8 is an in-vehicle video signal output device. The DVD player 9 is an in-vehicle video signal output and optical disc reading device.

The position search device 2 includes a GPS receiver 11, a gyroscope 12 and a distance sensor 13. The GPS receiver 11 measures the position of the vehicle based on a radio wave from satellites. These components 11 to 13 of the position search device 2 have respective errors in the outputs applied to the control device 5. Therefore, the control device 5 determines a current position, a traveling direction, a speed and a mileage of the vehicle by compensating for the error of the output of one component by the outputs of other components.

The map data reading device 3 is a DVD drive and reads map data stored on a DVD 14. Various data including map data for navigation and other data including Points of Interest. The map data includes shape, width and name of roads, building, Points of Interest, name of places and geographical features. It also includes data necessary to reproduce the map on the display 7. The reference data include names, addresses, phone numbers and zip codes of facilities and shops.

The group of operation switches 4 includes a variety of mechanical switches for command inputs to search and set a destination, select a map to display on the display 7, and audio and video functions. Some switches are included in a touch panel (not shown) provided on the display 7.

On the display 7, a road map is usually displayed with various scales. A pointer that indicates the current location and direction of the vehicle is displayed on the map. A data entry screen is also displayed for destination search and set. When a route guidance function is enabled to search a route to the destination and start guidance, the route is indicated on the map.

The control device 5 is a regular computer including a CPU, a ROM, a RAM and I/O interface and bus lines (not shown). It performs the following functions (means): current position search, region determination, function setting, message display and setting information retrieval. These functions are performed for automatic video display setting.

The control device 5 also performs control functions to execute navigation processes including a route guidance function. The route guidance function is for searching a route to a destination and guiding to the destination. Moreover, the control device 5 performs audio and video control for the TV tuner 8, DVD player 9 and VCR 10.

Output lines of the TV tuner 8, DVD player 9 and VCR 10 are connected to the display 7 via a switching circuit 15. When the switching circuit 15 is switched on by the control device 5, video signals from the TV tuner 8, DVD player 9 or VCR 10 are outputted to the display 7.

The video signals must match a video standard corresponding to a TV system used in a region in which the vehicle is currently located. A video standard is a standard that determines the way a video signal is outputted to a display device. A plurality of video standards corresponding to TV systems used in the world is set in the TV tuner 8 and DVD player 9. A specific video standard is selected by the control device 5 for a region in which the vehicle is located.

In the DVD player 9, region codes are provided. Codes are assigned to regions of the world for DVD copyright protection. For instance, the region code 1 is assigned to the United States and Canada, and the region code 2 is assigned to West Europe, Middle East, South Africa and Japan. The region codes can be reset by the control device 5. The DVD can be played only when the region codes stored on the DVD and in the DVD player match.

Operating conditions of the switching circuit 15, TV tuner 8 and DVD player 9 are set by the control device 5 and stored in the ROM 16 as a setting information table. Different setting information tables can be used by changing the ROM 16.

Figures 2, 3:
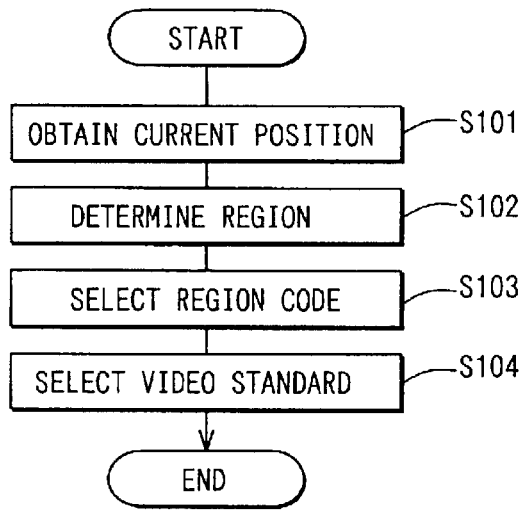
FIG. 2 is a table showing an example of setting information according to the embodiment of the present invention.
FIG. 3 is a flowchart showing a startup operation of the in-vehicle accessory system according to the embodiment of the preset invention.

One example of the information table is shown in FIG. 2. The table has Country/State, Video Display, DVD Region Code and Video Standard columns. The video display permission, region code and video standard are set for each country or State and written in the Video Display, DVD Region Code and Video Standard columns, respectively. The control device 5 refers to this table when setting the functions of the display 7, TV tuner 8 and DVD player 9. The table shown in FIG. 2 is created for purposes of illustration and may be different from actual settings.

When a user turns on an accessory switch, the control device 5 executes a startup operation as shown in FIG. 3. The control device 5 obtains a current position of the vehicle from the position search device 2 (S101). Then, it determines the region of the current position based on the map data read from the DVD 14 (S102). For instance, it determines a State if the current position is in the United States, or a country if the current position is in Europe. The current position acquisition from the position search device 2 is performed even the navigation function is OFF.

Next, the control device 5 selects a region code set in the DVD player 9 (S103). The control device 5 refers to the setting information table shown in FIG. 2 and obtains the region code for the region determined at step S102. Then, it sets the obtained region code in the DVD player 9. Since a video standard differs from region to region (country to country), it sets the video standard for the region in the DVD player 9 at the same time.

The control device 5 sets the video standard for the TV tuner 8 (S104). Since a video standard of the TV tuner 8 differs from country to country, it sets the video standard for the region in the TV tuner 8. It refers to the information table shown in FIG. 2 and obtains the video standard for the region. Then, it sets the video standard in the TV tuner 8.

Figure 4:
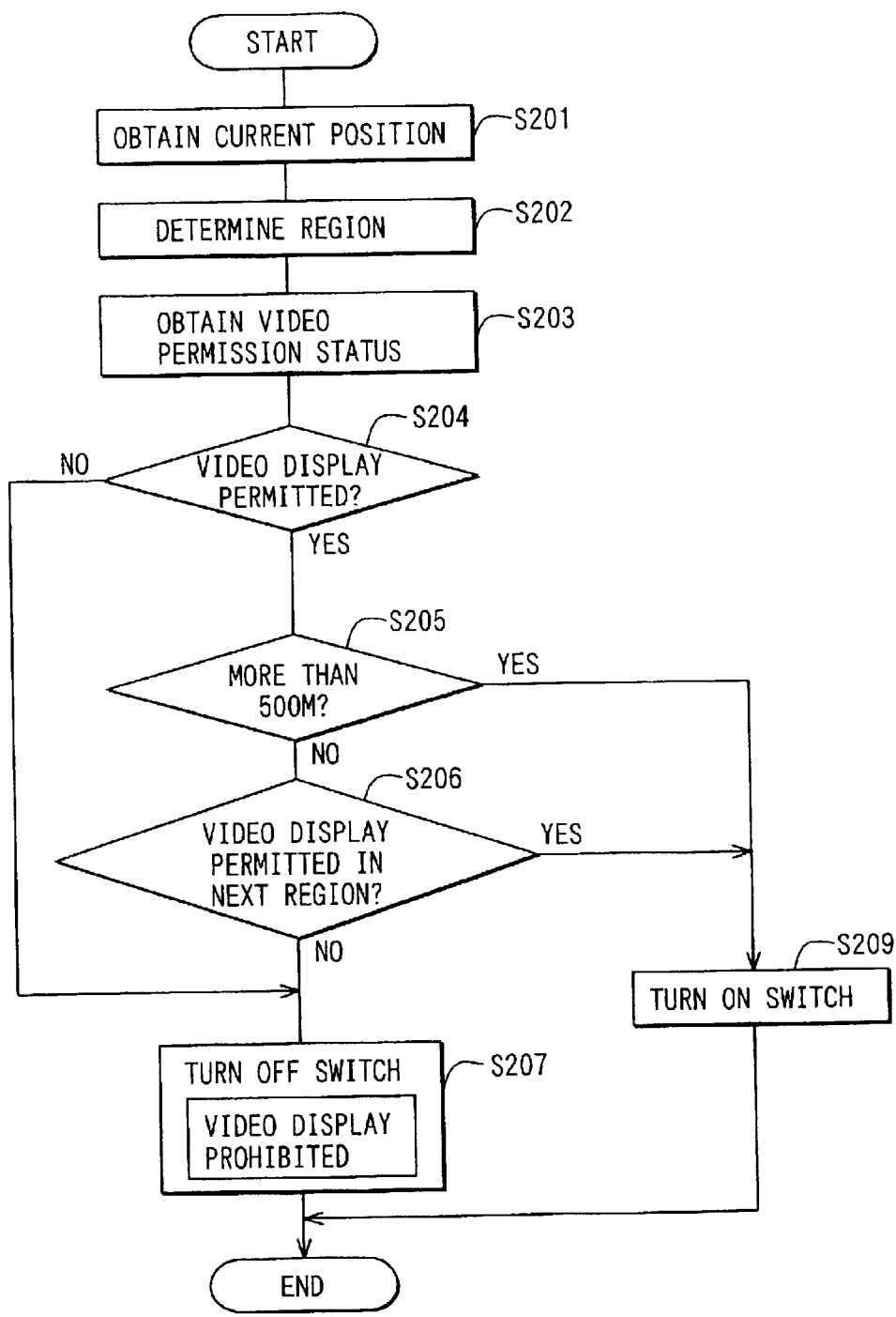
FIG. 4 is a flowchart showing an operation to limit video signal output performed by the in-vehicle accessory system according to the embodiment of the present invention.

When the user executes an audio/visual related operation, the control device 5 performs a video signal output control as shown in FIG. 4. The audio/visual related operation includes an operation to watch TV, play a DVD on the DVD player 9, or play a videotape on the VCR 10. The control device 5 determines the region in which the vehicle is currently located (step S201 and S202). Then, the control device 5 refers to the information table shown in FIG. 2 for a video display permission status of the region (S203).

The control device 5 then determines whether outputting the video signals to the display 7 is permitted based on the data in the information table shown in FIG. 2 (S204). If the video signal output is not permitted, it turns off the switching circuit 15 and displays a massage "video display prohibited" on the display 7 (S207). This notifies the user that the vehicle is located in the region in which the video display is prohibited.

If the video signal output is permitted, it determines whether the current position is more than 500 m away from a region border (S205). Because the region determination at step S202 is performed based on the GPS system and map data, a relatively large error may occur. When the current location of the vehicle is close to the border, the control device 5 may erroneously determine the vehicle is still within the border after the vehicle crosses it. This may put the user in trouble for violating the regulations. Therefore, the control device 5 executes step S205.

If the current position is more than 500 m away from the border, the control device 5 turns on the switching circuit 15 (S209). Since video signals from the TV tuner 8, DVD player 9 and VCR 10 are inputted to the display 7 via the switching circuit 15, the user can watch TV or play videos or DVDs.

If the current position is within 500 m from the border, the control device 5 determines whether the video display is permitted in the next region (S206). If the video display is permitted, the switching circuit 15 remains turned on. If the video display is prohibited in the next region, the control device 5 turns off the switching circuit 15 and displays the message (S207). This prevents a violation of the regulations even when the determined position differs from the actual position.

In the accessory system 1 of this embodiment, the region in which the vehicle is currently located is determined upon a startup of the system. A region code and a video standard are set based on the determined region. Thus, vehicles on which same accessory systems are installed can be sold regardless of regions. This makes manufacturing and sales management of the system easier and reduces the costs.

When the user executes an operation for outputting the video signals to the display 7, the system 1 determines the region in which the vehicle is currently located. Then the system 1 determines whether the video signal output is permitted in the determined region, referring to the information table shown in FIG. 2. Therefore, the user can always follow the regulations even when the vehicle enters into the region in which the video signal output is prohibited.

Moreover, the video signal output to the display 7 is terminated when the vehicle is located close to the region in which the video display is prohibited. Therefore, the user can still follow the regulations even when the determined current position is off the actual position of the vehicle. When the video signal output to the display 7 is terminated, a message indicating the termination of video signal output operation is displayed to notify the user.

The present invention should not be limited to the embodiment previously discussed and shown in the figures, but may be implemented in various ways without departing from the spirit of the invention. For instance, a specific function of the navigation system, such as a route setting function, may be enabled or disabled based on the setting information corresponding to the current location.

The setting information may be stored on the DVD 14, on which the map data is stored, and the map data reading device 3 reads the data from the DVD 14. When the setting information is revised due to regulation amendments, it is preferable to distribute a new DVD with the revised setting information.

The external information I/O device 6 may receive the setting data corresponding to regions via optical beacons. The setting information table shown in FIG. 2 can be rewritable. The region code that is set in the DVD player 9 can be fixed as initial settings upon the system startup.

What is claimed is:

1. An in-vehicle accessory system comprising:
    a video signal output device, which is an optical disk playback device for a playback of an optical disk that contains a region code assigned to a region of the world;
    a current position search means for searching a current position of a vehicle;
    a region determination means for, determining a region in which the current position of the vehicle is located;
    a setting information retrieval means for selecting a region code set in the video signal output device for the region determined by the region determination means so that a region code in the video signal output device and the region code on the optical disk match, and retrieving setting information of the video signal output device for the determined region, the setting information being different from region to region;
    a function setting means for setting a function of the video signal output device based on the retrieved setting information and determining whether the current position of the vehicle is within a predetermined distance from a border between the determined region and a next region thereof in which a different function setting is required; and
    a control means for disabling the function of the video signal output device when the current position is within the predetermined distance.

2. The in-vehicle accessory system as in claim 1, further comprising a message display means for notifying a user of the system that the function of the video signal output device is disabled.

3. The in-vehicle accessory system as in claim 1, wherein the function set by the function setting means includes a control of video signal output operation of the video signal output device.

4. The in-vehicle accessory system as in claim 1, further comprising a setting information storing means, wherein:
    the setting information storing means stores the setting information of the video signal output device; and
    the setting information retrieval means retrieves information front the setting information storing means.

5. The in-vehicle accessory system as in claim 4, wherein the setting information storing means is configured so that the information stored in the setting information storing means is changeable.

6. The in-vehicle accessory system as in claim 1, further comprising a receiver means, wherein:
    the receiver means receives the setting information; and
    the setting information retrieval means retrieves the information from the receiver means.

7. The in-vehicle accessory system as in claim 6, wherein the receiver means is a traffic information receiver.

8. The in-vehicle accessory system as in claim 1, further comprising a switching means, wherein the function setting means utilizes the switching means to set the function.

9. A function setting method for an in-vehicle accessory system comprising:
    searching a current position of a vehicle;
    determining a region in which the searched current position of the vehicle is located;
    setting a region code for the determined region;
    retrieving setting information of the in-vehicle accessory system based on the reagion code; and
    setting a function of the in-vehicle accessory system based on the retrieved setting information, wherein the function setting includes:
    determining whether the current position is within a predetermined distance from a border between the determined region and a next region thereof;
    determining whether use of the function is prohibited in the next region; and
    disabling the function when the current position is within the predetermined distance and the use of the function in the next region is prohibited.

10. The function setting method for the in-vehicle accessory system as in claim 9, wherein the function setting includes setting a video standard used in the determined region.

11. A function setting method for an in-vehicle accessory system including a video signal output device, which is an optical disk playback device for a playback of an optical disk that contains a region code assigned to a region of the world comprising:
    searching a current position of a vehicle;
    determining a region in which the current position of the vehicle is located;
    selecting a region code corresponding to the region for the video signal output device so that the region code in the video signal output device and the region code on the optical disk match;
    retrieving setting information of the video signal output device for the determined region;
    setting a function of the video signal output device based on the retrieved setting information;
    determining whether the current position is within a predetermined distance from a border between the determined region and a next region thereof;
    determining whether use of the function is prohibited in the next region; and
    disabling the function when the current position is within the predetermined distance and the use of the function in the next region is prohibited.

12. The function method as in claim 11, wherein the function setting includes setting a video standard used in the determined regions.

* * * * *